(12) United States Patent
Jin et al.

(10) Patent No.: US 11,801,545 B2
(45) Date of Patent: Oct. 31, 2023

(54) PRESS BRAKE CONTROL DEVICE, PRESS BRAKE CONTROL METHOD, TOOL, AND DATA STRUCTURE OF TOOL INFORMATION

(71) Applicant: Amada Co., Ltd., Kanagawa (JP)

(72) Inventors: Yingjun Jin, Kanagawa (JP); Yohei Fuchinoue, Kanagawa (JP); Hitoshi Omata, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 142 days.

(21) Appl. No.: 17/057,723

(22) PCT Filed: Apr. 5, 2019

(86) PCT No.: PCT/JP2019/015107
§ 371 (c)(1),
(2) Date: Nov. 23, 2020

(87) PCT Pub. No.: WO2018/230192
PCT Pub. Date: Dec. 5, 2019

(65) Prior Publication Data
US 2021/0197247 A1    Jul. 1, 2021

(30) Foreign Application Priority Data
May 28, 2018   (JP) ................................. 2018-101219

(51) Int. Cl.
*B21D 55/00*   (2006.01)
*B21D 5/02*    (2006.01)

(52) U.S. Cl.
CPC .............. *B21D 55/00* (2013.01); *B21D 5/02* (2013.01); *B21D 5/0272* (2013.01)

(58) Field of Classification Search
CPC ............................. B21D 5/0272; B21D 5/004
See application file for complete search history.

(56) References Cited

U.S. PATENT DOCUMENTS 5,857,366 A * 1/1999 Koyama ................ B21D 5/004
                                                72/389.5
6,192,732 B1   2/2001 Kojima
(Continued)

FOREIGN PATENT DOCUMENTS

JP        9-192746 A      7/1997
JP       H09192746 A  *   7/1997
(Continued)

OTHER PUBLICATIONS

Supplementary Partial European Search Report dated Jul. 5, 2021, for corresponding European Patent Application Mo. 19812250.9.
(Continued)

*Primary Examiner* — Katrina M Stransky
*Assistant Examiner* — P Derek Pressley
(74) *Attorney, Agent, or Firm* — Renner, Otto, Boisselle & Sklar, LLP

(57) ABSTRACT

When a sheet metal is sandwiched between a punch held by a punch holder and a die held by a die holder to bend the sheet metal at a set bending angle by moving the punch toward the die, a stroke calculation unit calculates a stroke of the punch for bending the sheet metal at the bending angle in consideration of a spring back amount of the bent sheet metal. A bending load calculation unit calculates a bending load required to bend the sheet metal at the bending angle. A punch deflection amount calculation unit calculates a punch deflection amount according to the bending load. A punch holder deflection amount calculation unit calculates a punch holder deflection amount according to the bending load. A depth value calculation unit calculates a depth value by adding at least the punch deflection amount and the punch holder deflection amount to the stroke.

13 Claims, 18 Drawing Sheets

(56) References Cited

U.S. PATENT DOCUMENTS 7,503,200 B2 *  3/2009  Gerritsen .............. B30B 15/245
                                              72/389.5
2016/0151820 A1  6/2016  Woidasky

FOREIGN PATENT DOCUMENTS

| JP | 10-109115 A    | 4/1998 |
|----|----------------|--------|
| JP | 2007203310 A   | 8/2007 |
| JP | 2016-530102 A  | 9/2016 |
| WO | 2011/096442 A1 | 8/2011 |
| WO | 2011096442 A1  | 8/2011 |

OTHER PUBLICATIONS

International Search Report for corresponding Application No. PCT/JP2019/015107, dated Jun. 25, 2019.
Written Opinion for corresponding Application No. PCT/JP2019/015107, dated Jun. 25, 2019.

* cited by examiner

Fig. 3
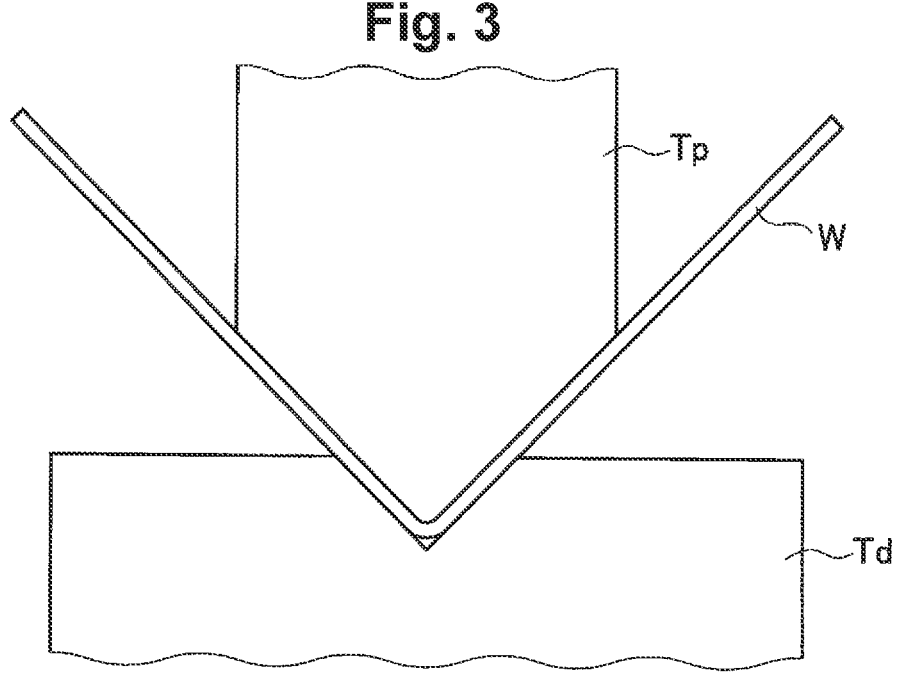
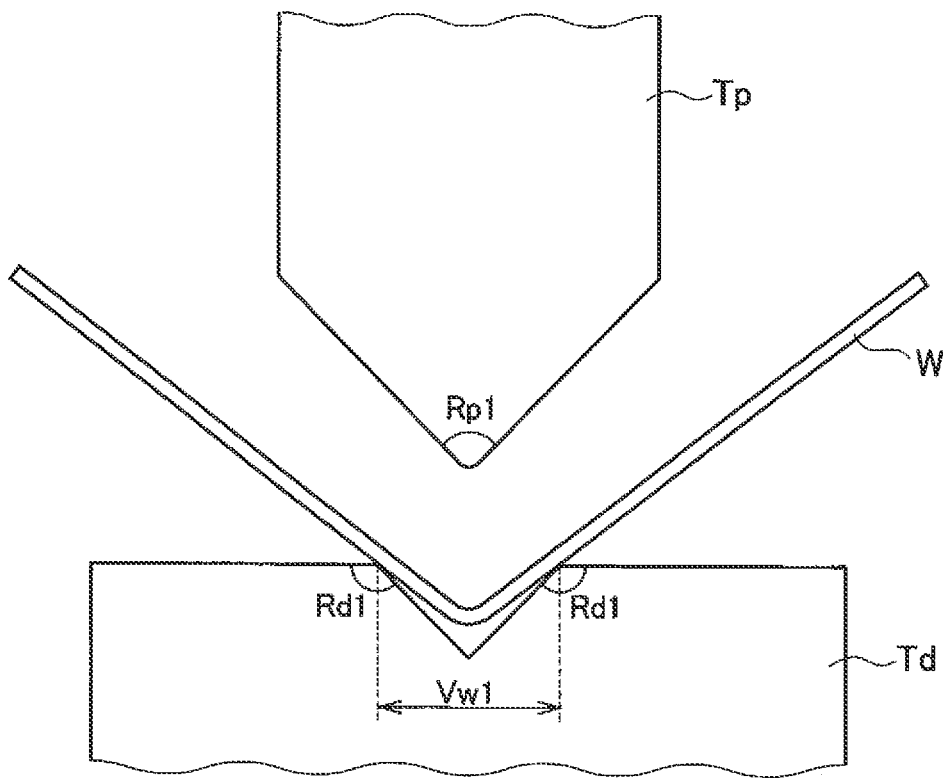

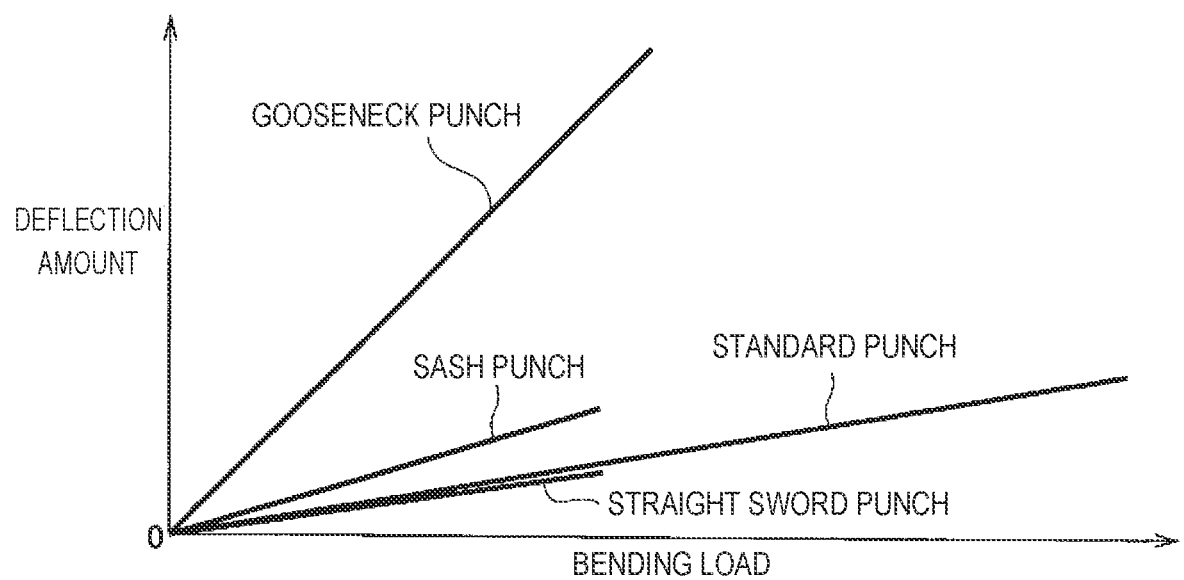

Fig. 18

| TOOL TYPE | MODEL NUMBER | SHAPE | ANGLE | HEIGHT | PRESSURE RESISTANCE | DEFLECTION COEFFICIENT | ..... |

TOOL INFORMATION

Fig. 20

| TOOL TYPE | MODEL NUMBER | SHAPE | ANGLE | HEIGHT | PRESSURE RESISTANCE | DEFLECTION COEFFICIENT CORRESPONDING TO PUNCH HOLDER NO. 1 | DEFLECTION COEFFICIENT CORRESPONDING TO PUNCH HOLDER NO. 2 | DEFLECTION COEFFICIENT CORRESPONDING TO PUNCH HOLDER NO. 3 | .... |

TOOL INFORMATION

PRESS BRAKE CONTROL DEVICE, PRESS BRAKE CONTROL METHOD, TOOL, AND DATA STRUCTURE OF TOOL INFORMATION

TECHNICAL FIELD

The present disclosure relates to a press brake control device, a press brake control method, a tool, and a data structure of tool information.

BACKGROUND ART

A press brake for bending a sheet metal includes an upper table on which a punch is mounted and a lower table on which a die is mounted. The press brake bends the sheet metal by lowering the upper table toward the lower table and then sandwiching the sheet metal disposed on the die between the punch and the die.

A distance (stroke) by which the punch is lowered toward the die from a state in which the tip of the punch is in contact with the sheet metal is determined by a desired bending angle of the sheet metal. However, in practice, due to the existence of deflection of side frames of the press brake as well as deflection of the upper table and the lower table, it is not possible to bend the sheet metal at a desired bending angle even if the punch is lowered by a calculated stroke.

Patent Literature 1 describes that a sheet metal is bent by obtaining a depth value (D value), which is a distance in which a stroke is corrected in consideration of deflection of the side frames and deflection of the upper table and the lower table, and then lowering the punch by the D value. Furthermore, Patent Literature 1 describes that a bending accuracy is improved by correcting the D value in consideration of deflection of the punch and then lowering the punch by the corrected D value to bend the sheet metal.

CITATION LIST

Patent Literature

Patent Literature 1: Japanese Patent Laid-Open No. 9-192746

SUMMARY

Though the bending accuracy is improved by using the corrected D value described in Patent Literature 1, it is not possible to bend the sheet metal at a desired bending angle thereby. Hence, there has been a demand for further improvement of the bending accuracy.

An object of embodiments is to provide a press brake control device, a press brake control method, a tool, and a data structure of tool information that can further improve the bending accuracy of a sheet metal.

According to a first aspect of the embodiment, there is provided a press brake control device including a stroke calculation unit configured to calculate, when a sheet metal is sandwiched between a punch held by a punch holder and a die held by a die holder and the punch is moved toward the die to bend the sheet metal at a set bending angle, a stroke of the punch for bending the sheet metal at the bending angle in consideration of a spring back amount of the bent sheet metal, a bending load calculation unit configured to calculate a bending load required to bend the sheet metal at the bending angle, a punch deflection amount calculation unit configured to calculate a punch deflection amount that is a deflection amount of the punch according to the bending load, a punch holder deflection amount calculation unit configured to calculate a punch holder deflection amount that is a deflection amount of the punch holder according to the bending load; and a depth value calculation unit configured to calculate a depth value by adding at least the punch deflection amount and the punch holder deflection amount to the stroke, the depth value being a distance by which the punch is moved toward the die.

According to a second aspect of the embodiment, there is provided a press brake control method, executed by a control device that controls a press brake for bending a sheet metal by sandwiching the sheet metal between a punch held by a punch holder and a die held by a die holder and then moving the punch toward the die, the press brake control method including calculating a stroke of the punch for bending the sheet metal at a set bending angle in consideration of a spring back amount of the bent sheet metal, calculating a bending load required to bend the sheet metal at the bending angle, calculating a punch deflection amount that is a deflection amount of the punch according to the bending load, calculating a punch holder deflection amount that is a deflection amount of the punch holder according to the bending load, calculating a depth value by adding at least the punch deflection amount and the punch holder deflection amount to the stroke, the depth value being a distance by which the punch is moved toward the die, and controlling such that the punch is moved by the depth value to bend the metal sheet.

According to a third aspect of the embodiment, there is provided a tool used for bending a sheet metal, the tool including a tool ID that indicates tool information including a deflection coefficient for calculating a deflection amount of the tool according to a predetermined bending load applied to the sheet metal at a time when the sheet metal is bent.

According to a fourth aspect of the embodiment, there is provided a data structure of tool information referred to by a control device that controls a press brake for bending a sheet metal by using a tool, the data structure including a deflection coefficient referred to by the control device when the control device calculates a deflection amount of the tool according to a predetermined bending load applied to the sheet metal at a time when the sheet metal is bent.

With the press brake control device, the press brake control method, the tool, and the data structure of the tool information of the embodiment, the bending accuracy of the sheet metal can be further improved.

BRIEF DESCRIPTION OF DRAWINGS

FIG. 3 is a view for explaining spring back of a bent sheet metal.

FIG. 8 is a characteristic diagram showing the relations between a bending load and a deflection amount with respect to the standard punch, the gooseneck punch, the sash punch, and the straight sword punch, respectively.

FIG. 18 is a diagram showing an example of a data structure of tool information referred to by the press brake control device of the third embodiment.

FIG. 20 is a diagram showing an example of a data structure of tool information referred to by a press brake control device of a fourth embodiment.

DESCRIPTION OF EMBODIMENTS

Hereinafter, the press brake control device, the press brake control method, the tool, and the data structure of the tool information of each embodiment will be described with reference to the accompanying drawings.

Figure 1:
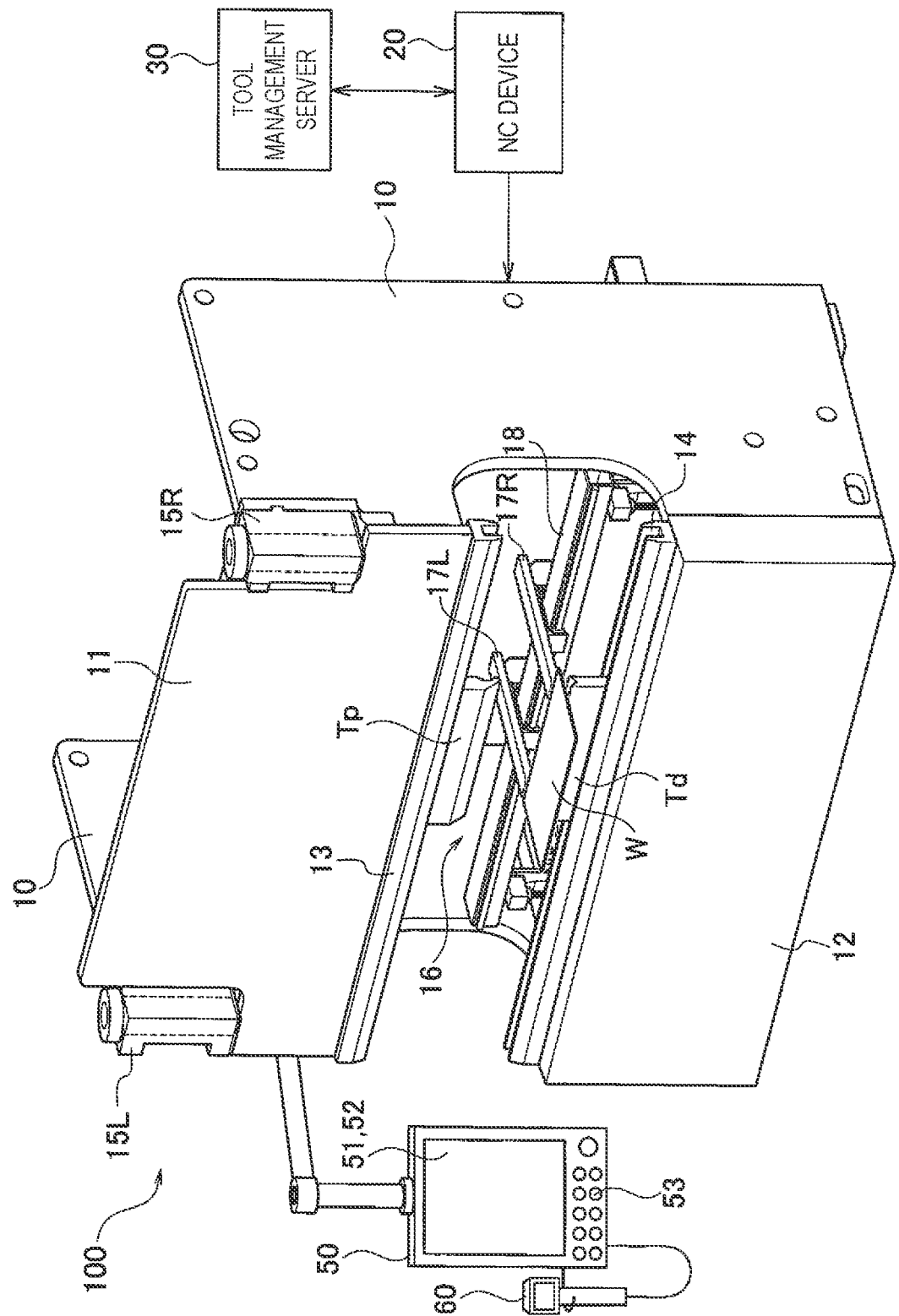
FIG. 1 is a diagram showing an example of an entire configuration of a press brake of each embodiment.

First, a schematic configuration and operation of a press brake that is common to each embodiment will be described. As shown in FIG. 1, an NC device 20 that functions as a press brake control device is connected to a press brake 100. A tool management server 30 is connected to the NC device 20. The tool management server 30 may be installed at a location away from the NC device 20 via a network. The tool management server 30 may be configured external to the press brake 100.

The press brake 100 includes left and right side frames 10, an upper table 11, and a lower table 12. A punch holder 13 is attached to the upper table 11, and a die holder 14 is attached to the lower table 12. The punch holder 13 and the die holder 14 are tool holders. The upper table 11 is configured to move up and down by hydraulic cylinders 15L and 15R provided on the left and the right, respectively. A punch Tp is mounted in the punch holder 13, and a die Td is mounted in the die holder 14.

FIG. 1 shows a modular type in which the punch holder 13 is integrally attached over the entire length of a lower end portion of the upper table 11. The punch holder 13 may be an intermediate plate type in which a plurality of intermediate plates in which the punch Tp is mounted are attached in a longitudinal direction of the lower end portion of the upper table 11.

Mounting the punch Tp to the upper table 11 means mounting the punch Tp in the punch holder 13 (including the case in which the punch holder 13 is an intermediate plate). Mounting the die Td to the lower table 12 means mounting the die Td in the die holder 14.

A back gauge 16 is provided behind the upper table 11 and the lower table 12. The back gauge 16 includes abutting members 17L and 17R that move in a lateral direction along a stretch 18. The abutting members 17L and 17R are configured to move also in a height direction and a longitudinal direction.

Before an operator disposes a sheet metal W on the die Td and bends the sheet metal W, the abutting members 17L and 17R move to positions corresponding to the die Td. The operator disposes the sheet metal W on the die Td such that the edge portions on the inner side of the sheet metal W abut against the abutting members 17L and 17R, respectively. That is, the abutting members 17L and 17R serve to determine the position of the sheet metal W in a longitudinal direction at a time when the sheet metal W is disposed on the die Td.

An operation pendant 50 having a display unit 51, a touch panel 52 mounted on a surface side of the display unit 51, and an operation unit 53 including a plurality of operation buttons is connected to the NC device 20. The touch panel 52 also functions as the operation unit. An operation input from the touch panel 52 or the operation unit 53 is supplied to the NC device 20.

A two-dimensional code reader 60 that is a reader for reading a two-dimensional code provided to the punch Tp and the die Td, which will be described later, is connected to the operation pendant 50. The two-dimensional code represents a tool ID (tool identification information) for individually identifying the tool. When a barcode is used instead of the two-dimensional code, a barcode reader may be connected to the operation pendant 50. When an IC tag (RF tag) is used instead of the two-dimensional code, a reader that reads the IC tag may be connected to the operation pendant 50.

In the press brake 100 configured as described above, the operator disposes the sheet metal W to be processed on the die Td as shown in FIG. 1. When the operator lowers the upper table 11, the sheet metal W is bent by being sandwiched between the punch Tp and the die Td.

First Embodiment

Figure 2:
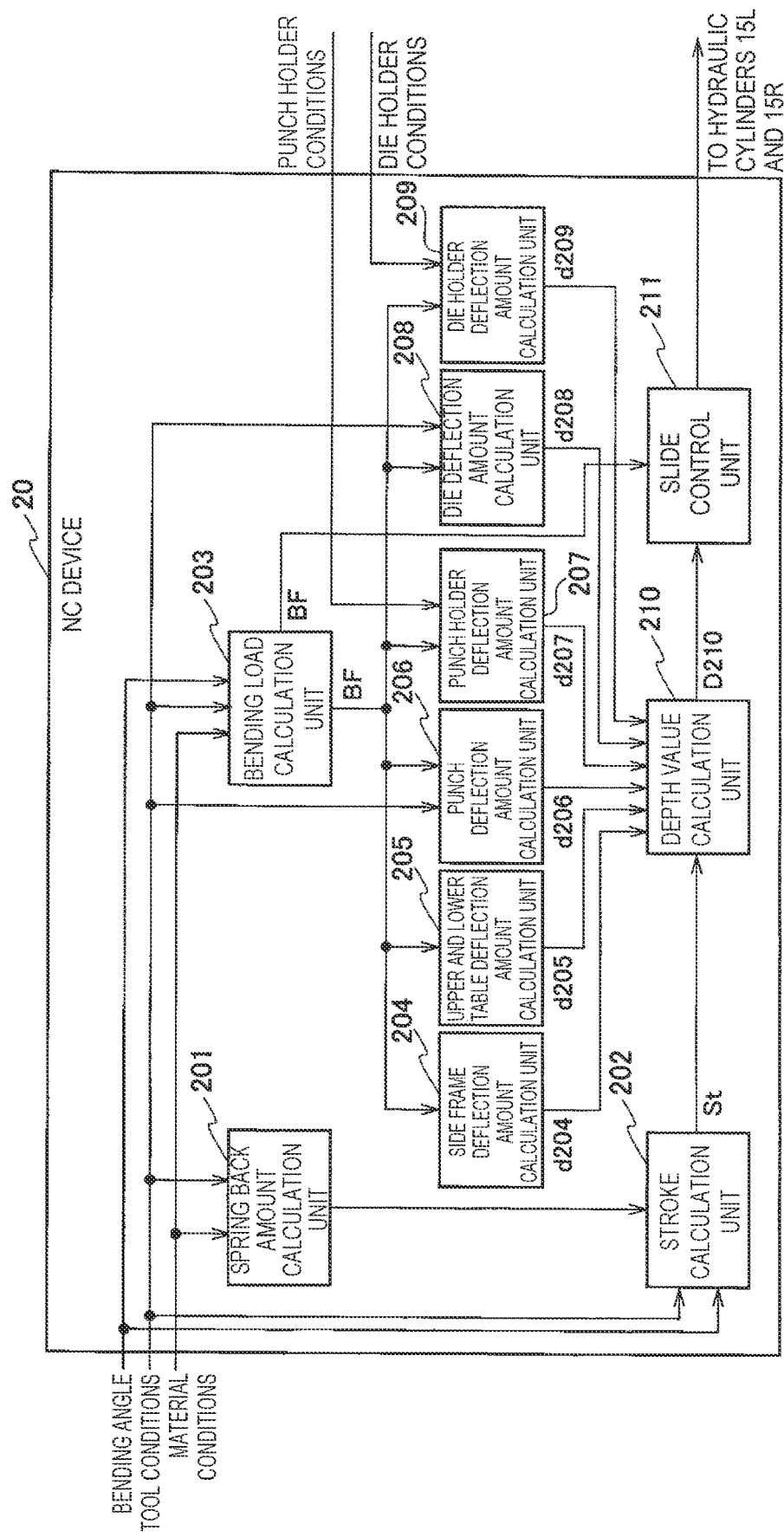
FIG. 2 is a block diagram showing a press brake control device of a first embodiment.

FIG. 2 shows a specific configuration of the NC device 20 that is a press brake control device of a first embodiment. The NC device 20 includes a spring back amount calculation unit 201, a stroke calculation unit 202, and a bending load calculation unit 203. The NC device 20 includes a side frame deflection amount calculation unit 204, an upper and lower table deflection amount calculation unit 205, a punch deflection amount calculation unit 206, a punch holder deflection amount calculation unit 207, a die deflection amount calculation unit 208, and a die holder deflection amount calculation unit 209. The NC device 20 includes a depth value calculation unit 210 and a slide control unit 211. Hereinafter, the depth value calculation unit 210 is referred to as the D value calculation unit 210, and the depth value is referred to as the D value.

As shown in FIG. 3, when the punch Tp is elevated after the sheet metal W is bent by being sandwiched between the punch Tp and the die Td, the bent sheet metal W tries to return to the original flat state, which makes the bending angle larger. This phenomenon is called spring back. Material conditions including at least a material and a thickness of the sheet metal W as well as tool conditions of the punch Tp and the die Td are input to the spring back amount calculation unit 201. The operator may operate the operation unit 53 to set the material conditions. The NC device 20 reads out the tool conditions of the tool to be used from the tool management server 30.

By using the material conditions and the tool conditions, the spring back amount calculation unit 201 calculates a spring back amount based on the plasticity theory calculation.

In order to calculate the spring back amount, the spring back amount calculation unit 201 uses, as the tool conditions, an angle Rp1 of the tip of the punch Tp, an angle Rd1 of both shoulder parts of a V-shaped groove of the die Td, and a width Vw1 of the V-shaped groove thereof (hereinafter referred to as a V width Vw1) shown in FIG. 3. The spring back amount calculation unit 201 supplies the calculated spring back amount to the stroke calculation unit 202.

Figure 4:
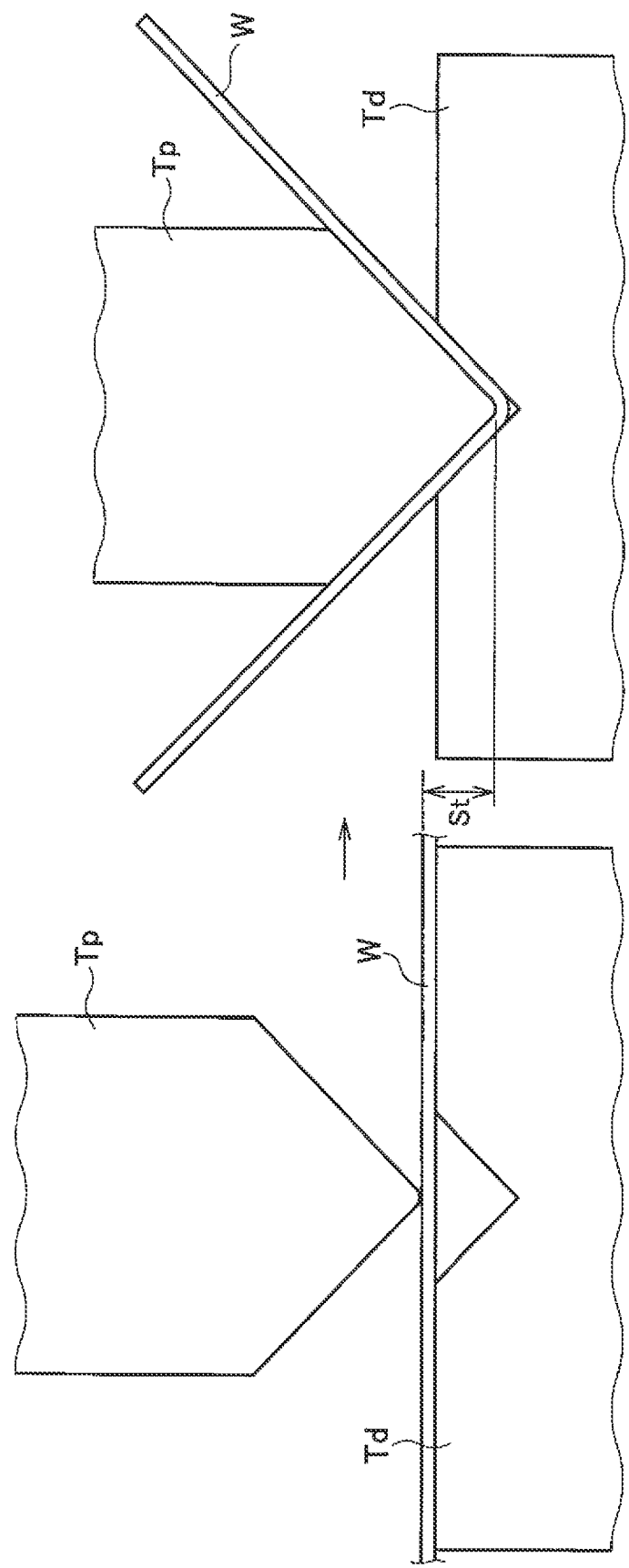
FIG. 4 is a view showing a stroke of a punch at a time when a sheet metal is bent by being sandwiched between a punch and a die.

The tool conditions and the bending angle are input to the stroke calculation unit 202. The operator may operate the operation unit 53 to set the bending angle. Based on the plasticity theory calculation, the stroke calculation unit 202 calculates, in consideration of the spring back amount, a stroke St for bending the sheet metal W at a desired bending angle. As shown in FIG. 4, the stroke St is a moving distance of the punch Tp at a time when the punch Tp is lowered toward the die Td to the lowest position from a state in which the tip of the punch Tp is in contact with the sheet metal W. The stroke calculation unit 202 supplies the calculated stroke St to the D value calculation unit 210.

The tool conditions, the material conditions, and the bending angle are input to the bending load calculation unit 203. By using the tool conditions, the material conditions, and the bending angle, the bending load calculation unit 203 calculates, based on the plasticity theory calculation, a bending load BF required to bend the sheet metal W at a desired bending angle. The bending load BF is a bending load per unit length. The bending load calculation unit 203 supplies the calculated bending load BF to the side frame deflection amount calculation unit 204, the upper and lower table deflection amount calculation unit 205, the punch deflection amount calculation unit 206, the punch holder deflection amount calculation unit 207, the die deflection amount calculation unit 208, the die holder deflection amount calculation unit 209, and the slide control unit 211.

Figure 5:
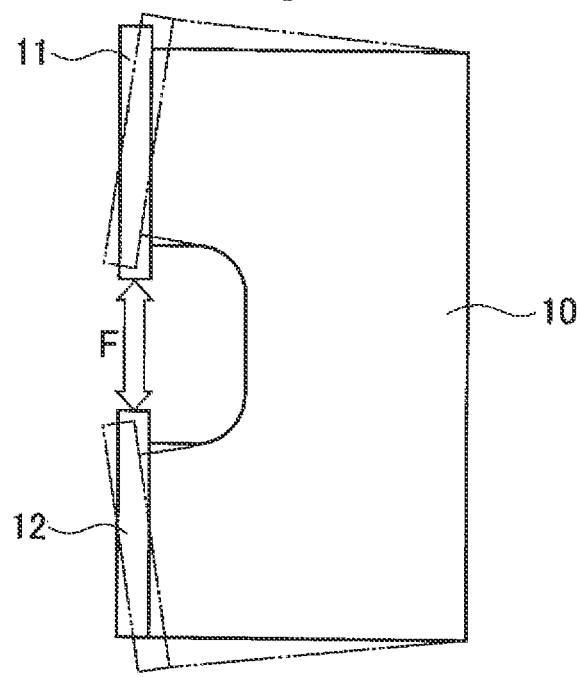
FIG. 5 is a conceptual diagram showing deflection of a side frame.

As conceptually shown in FIG. 5, when a force F is applied between the upper table 11 and the lower table 12, the side frame 10 deflect such that the distance between the upper table 11 and the lower table 12 is widened. The deflection amount of the side frame 10 is proportional to the bending load BF. When the deflection amount of the side frame 10 is defined as a side frame deflection amount d204, the side frame deflection amount calculation unit 204 calculates the side frame deflection amount d204 by a known method. The side frame deflection amount d204 is supplied to the D value calculation unit 210.

Figure 6:
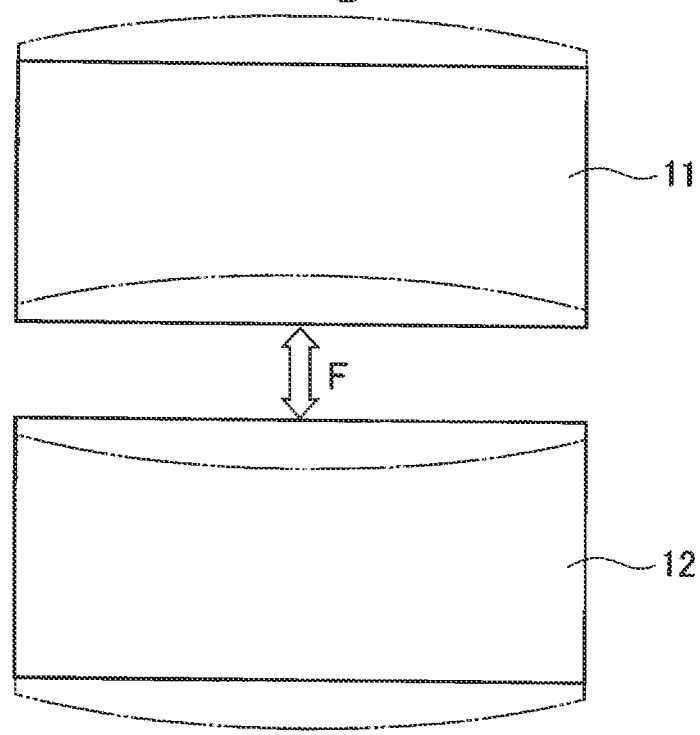
FIG. 6 is a conceptual diagram showing deflection of an upper table and a lower table.

As conceptually shown in FIG. 6, when a force F is applied between the upper table 11 and the lower table 12, the upper table 11 and the lower table 12 deflect such that the gap between the two is widened as they approach the center in a lateral direction. The deflection amount of the upper table 11 and the lower table 12 is proportional to the bending load BF and a bending length. When the deflection amount of the upper table 11 and the lower table 12 is defined as a table deflection amount d205, the upper and lower table deflection amount calculation unit 205 calculates the table deflection amount d205 by a known method. The table deflection amount d205 is supplied to the D value calculation unit 210.

The lower table 12 may include a crowning mechanism that pushes up the lower table 12 toward the upper table 11. In this case, it is not necessary to calculate the table deflection amount d205.

Figure 7A:
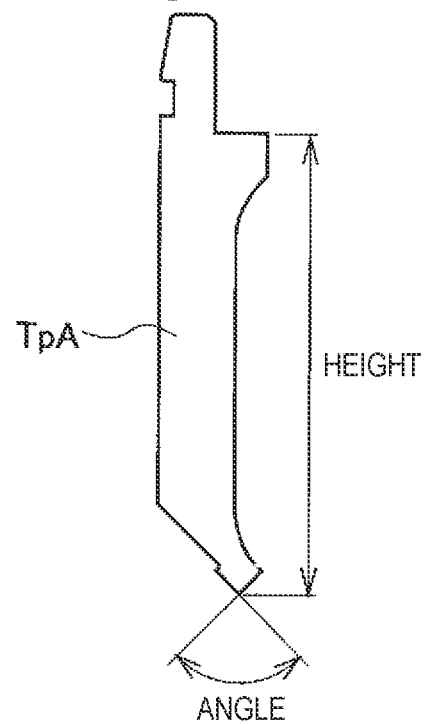
FIG. 7A is a side view showing a standard punch.
Figure 7B:
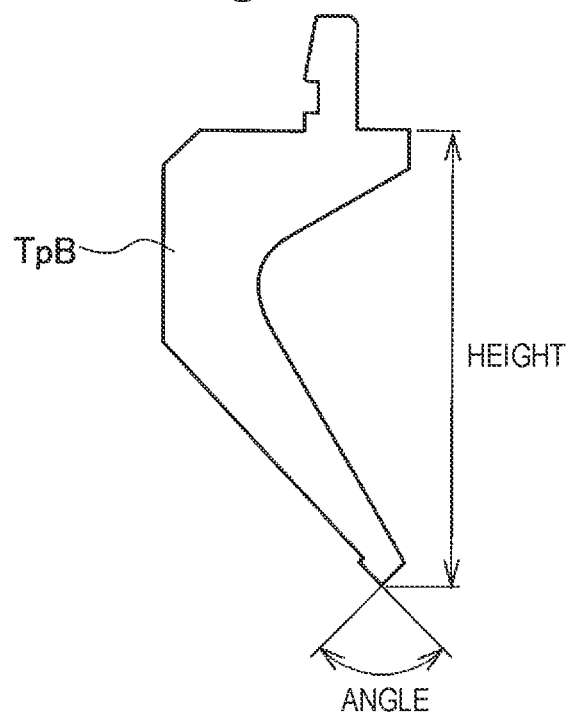
FIG. 7B is a side view showing a gooseneck punch.
Figure 7C:
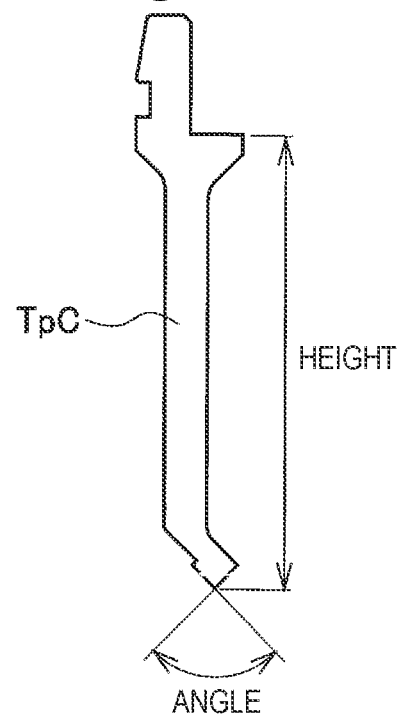
FIG. 7C is a side view showing a sash punch.
Figure 7D:
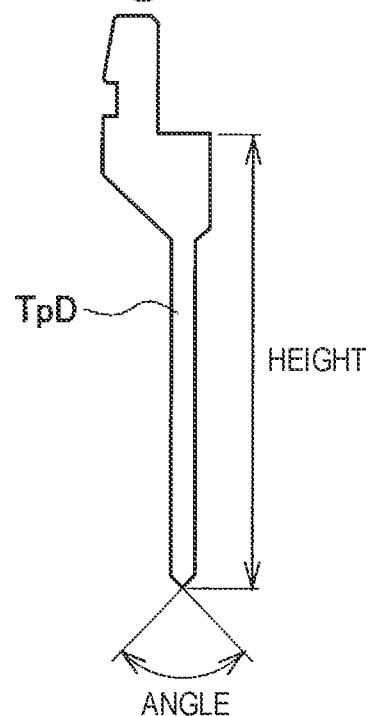
FIG. 7D is a side view showing a straight sword punch.

The punch deflection amount calculation unit 206 calculates a deflection amount of the punch Tp according to the bending load. The deflection amount of the punch Tp varies depending on the shape of the punch Tp. FIG. 7A shows a standard punch TpA that is a punch Tp having a standard shape. FIG. 7B shows a gooseneck punch TpB that is a punch Tp referred to as a gooseneck. FIG. 7C shows a sash punch TpC that is a punch Tp for a sash. FIG. 7D shows a straight sword punch TpD that is a punch Tp referred to as a straight sword. The height and the angle of each punch Tp are the height and the angle of the parts each shown in FIGS. 7A to 7D.

FIG. 8 shows the relations between the bending load and the deflection amount with respect to the standard punch TpA, the gooseneck punch TpB, the sash punch TpC, and the straight sword punch TpD, respectively. Since the pressure resistance is different among the standard punch TpA, the gooseneck punch TpB, the sash punch TpC, and the straight sword punch TpD, the maximum bending load among them is different. The relation between the bending load and the deflection amount for each punch Tp may be obtained by actual measurement, or may be obtained by using the FEM (finite element method) analysis.

It has been confirmed through the verification by the present inventors that the relation between the bending load and the deflection amount with respect to each punch Tp obtained by using the FEM analysis is almost the same as that obtained by actual measurement. Similarly, regarding the relation between the bending load and the deflection amount with respect to the punch holder 13, the relation between the bending load and the deflection amount with respect to the die Td, and the relation between the bending load and the deflection amount with respect to the die holder 14, which will be described later, it has been confirmed that there is almost no difference between the ones obtained by using the FEM analysis and the ones obtained by actual measurement. Therefore, either actual measurement or the FEM analysis may be used.

When the deflection amount of the punch Tp is defined as a punch deflection amount d206, the punch deflection amount d206 can be obtained by a calculation formula of d206=k×BF. In the calculation formula, k is a slope of each characteristic shown in FIG. 8, and k is referred to as a deflection coefficient k. In the calculation formula, BF is a bending load per unit length as described above, and the same applies to calculation formulae described later.

Figure 9:
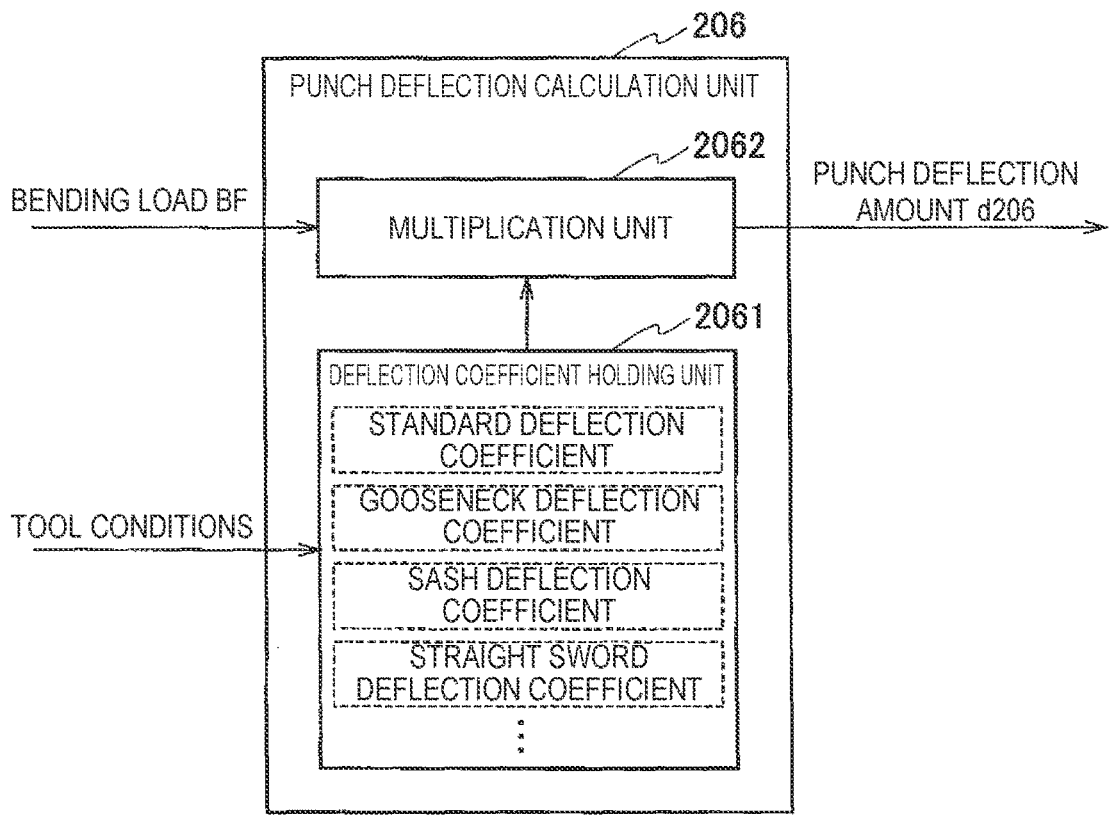
FIG. 9 is a block diagram showing a configuration example of a punch deflection amount calculation unit provided to a press brake control device of a first embodiment.

As shown in FIG. 9, the punch deflection amount calculation unit 206 includes a deflection coefficient holding unit 2061 and a multiplication unit 2062. The deflection coefficient holding unit 2061 holds, as the deflection coefficients k, a standard deflection coefficient for the standard punch TpA, a gooseneck deflection coefficient for the gooseneck punch TpB, a sash deflection coefficient for the sash punch TpC, a straight sword deflection coefficient for the straight sword punch TpD, and deflection coefficients for a plurality of other punches. The other punches include, for example, a punch of a special type. The punch deflection amount calculation unit 206 reads out, from the deflection coefficient holding unit 2061, the deflection coefficient k of the punch Tp that is being used according to the input tool condition, and supplies the readout coefficient k to the multiplication unit 2062.

The bending load BF is input to the multiplication unit 2062. The multiplication unit 2062 multiplies the bending load BF by the input deflection coefficient k to calculate the punch deflection amount d206. The punch deflection amount d206 is supplied to the D value calculation unit 210.

Figure 10:
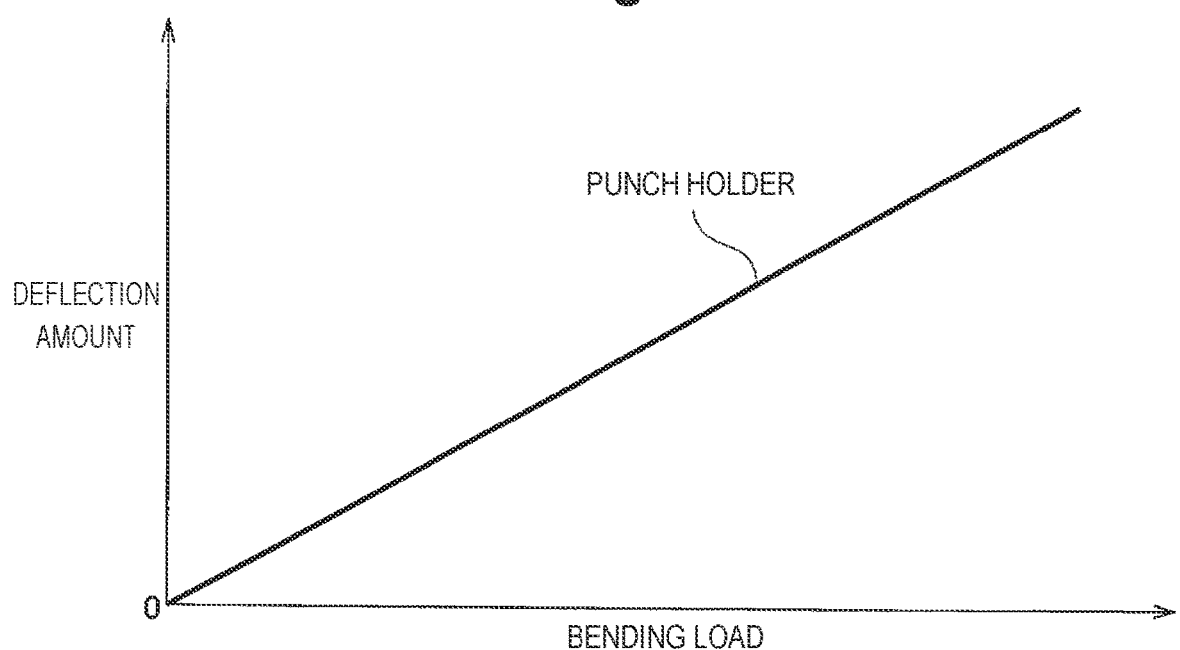
FIG. 10 is a characteristic diagram showing the relation between the bending load and the deflection amount with respect to a punch holder.

The punch holder deflection amount calculation unit 207 calculates a deflection amount of the punch holder 13 according to the bending load. FIG. 10 shows the relation between the bending load and the deflection amount with respect to the punch holder 13. When the deflection amount of the punch holder 13 is defined as a punch holder deflection amount d207, the punch holder deflection amount d207 can be obtained by the calculation formula of d207=k×BF. Here, the deflection coefficient k is a slope of the characteristic shown in FIG. 10.

Though only one characteristic of the punch holder 13 is shown in FIG. 10, the deflection coefficient k varies depending on whether the punch holder 13 is a modular type or an intermediate plate type. The deflection coefficient k also varies depending on whether the punch holder 13 is a hydraulic intermediate plate or a mechanical intermediate plate. In general, since the hydraulic intermediate plate tends to deflect less than the mechanical intermediate plate, the deflection coefficient k of the former one is smaller than that of the latter one.

In a similar manner to FIG. 9, the punch holder deflection amount calculation unit 207 includes a deflection coefficient holding unit that holds the deflection coefficients k of various types of the punch holders 13 and a multiplication unit that multiplies the bending load BF by the deflection coefficient k of the punch holder 13 that is selected based on the punch holder conditions to calculate the punch holder deflection amount d207. The punch holder deflection amount d207 is supplied to the D value calculation unit 210.

When the press brake 100 uses one type of the punch holder 13 in a fixed manner, the punch holder deflection amount calculation unit 207 may hold a deflection coefficient k of that one type of the punch holder 13 to calculate the punch holder deflection amount d207. In this case, it is not necessary to supply the punch holder conditions to the punch holder deflection amount calculation unit 207.

Figure 11:
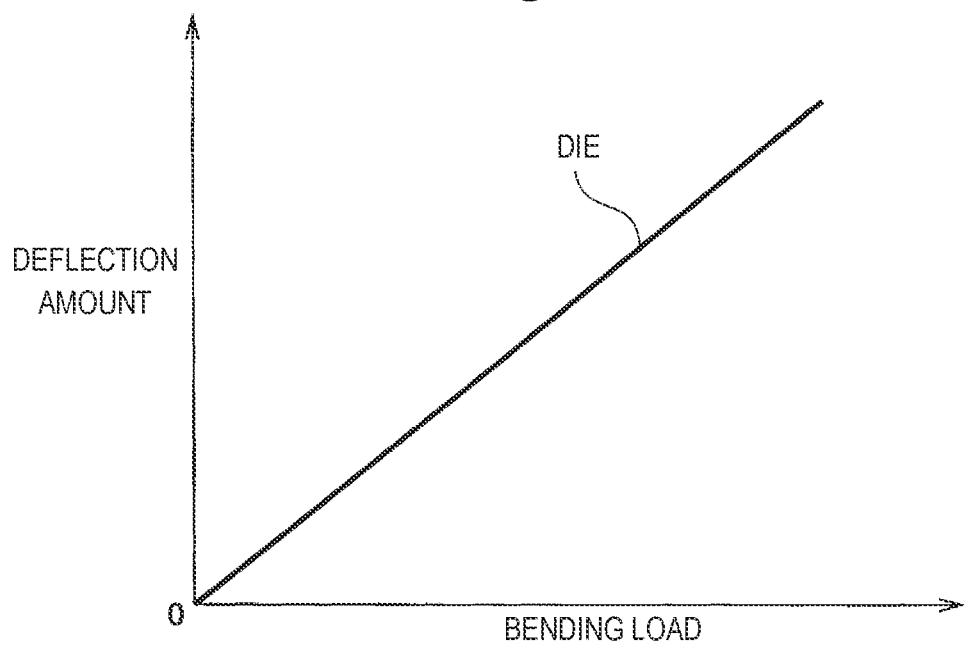
FIG. 11 is a characteristic diagram showing the relation between the bending load and the deflection amount with respect to a die.

The die deflection amount calculation unit 208 calculates a deflection amount of the die Td according to the bending load. FIG. 11 shows the relation between the bending load and the deflection amount with respect to the die Td. When the deflection amount of the die Td is defined as a die deflection amount d208, the die deflection amount d208 can be obtained by the calculation formula of d208=k×BF. Here, the deflection coefficient k is a slope of the characteristic shown in FIG. 11.

Though only one characteristic of the die Td is shown in FIG. 11, the deflection coefficient k varies depending on the type and the V width Vw1 of the die Td. In a similar manner to FIG. 9, the die deflection amount calculation unit 208 includes a deflection coefficient holding unit that holds the deflection coefficients k of various types of the dies Td and a multiplication unit that multiplies the bending load BF by the deflection coefficient k of the selected die Td to calculate the die deflection amount d208. The die deflection amount d208 is supplied to the D value calculation unit 210.

Figure 12:
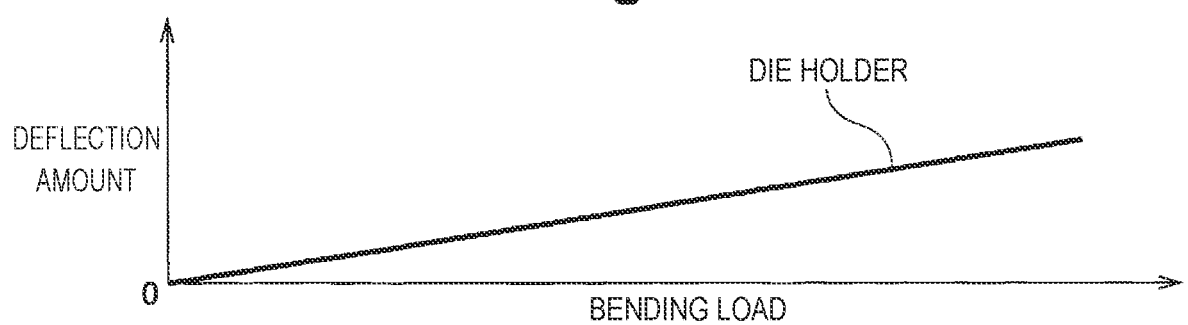
FIG. 12 is a characteristic diagram showing the relation between the bending load and the deflection amount with respect to a die holder.

The die holder deflection amount calculation unit 209 calculates a deflection amount of the die holder 14 according to the bending load. FIG. 12 shows the relation between the bending load and the deflection amount with respect to the die holder 14. When the deflection amount of the die holder 14 is defined as a die holder deflection amount d209, the die holder deflection amount d209 can be obtained by the calculation formula of d209=k×BF. Here, the deflection coefficient k is a slope of the characteristic shown in FIG. 12.

Though only one characteristic of the die holder 14 is shown in FIG. 12, the deflection coefficient k varies depending on the type of the die holder 14. In a similar manner to FIG. 9, the die holder deflection amount calculation unit 209 includes a deflection coefficient holding unit that holds the deflection coefficients k of various types of the die holders 14 and a multiplication unit that multiplies the bending load BF by the deflection coefficient k of the die holder 14 that is selected based on the die holder conditions. The die holder deflection amount d209 is supplied to the D value calculation unit 210.

When the press brake 100 uses one type of the die holder 14 in a fixed manner, the die holder deflection amount calculation unit 209 may hold a deflection coefficient k of that one type of the die holder 14 to calculate the die holder deflection amount d209. In this case, it is not necessary to supply the die holder conditions to the die holder deflection amount calculation unit 209.

Returning to FIG. 2, the D value calculation unit 210 calculates a D value D210, which is an actual distance for which the punch Tp is lowered, by adding the side frame deflection amount d204, the table deflection amount d205, the punch deflection amount d206, the punch holder deflection amount d207, the die deflection amount d208, and the die holder deflection amount d209 to the stroke St. The slide control unit 211 controls the hydraulic cylinders 15L and 15R such that the bending load BF is applied to between the punch Tp and the die Td to lower the upper table 11 (punch Tp) by a distance indicated by the D value D210 and the sheet metal W is bent.

Figure 13:
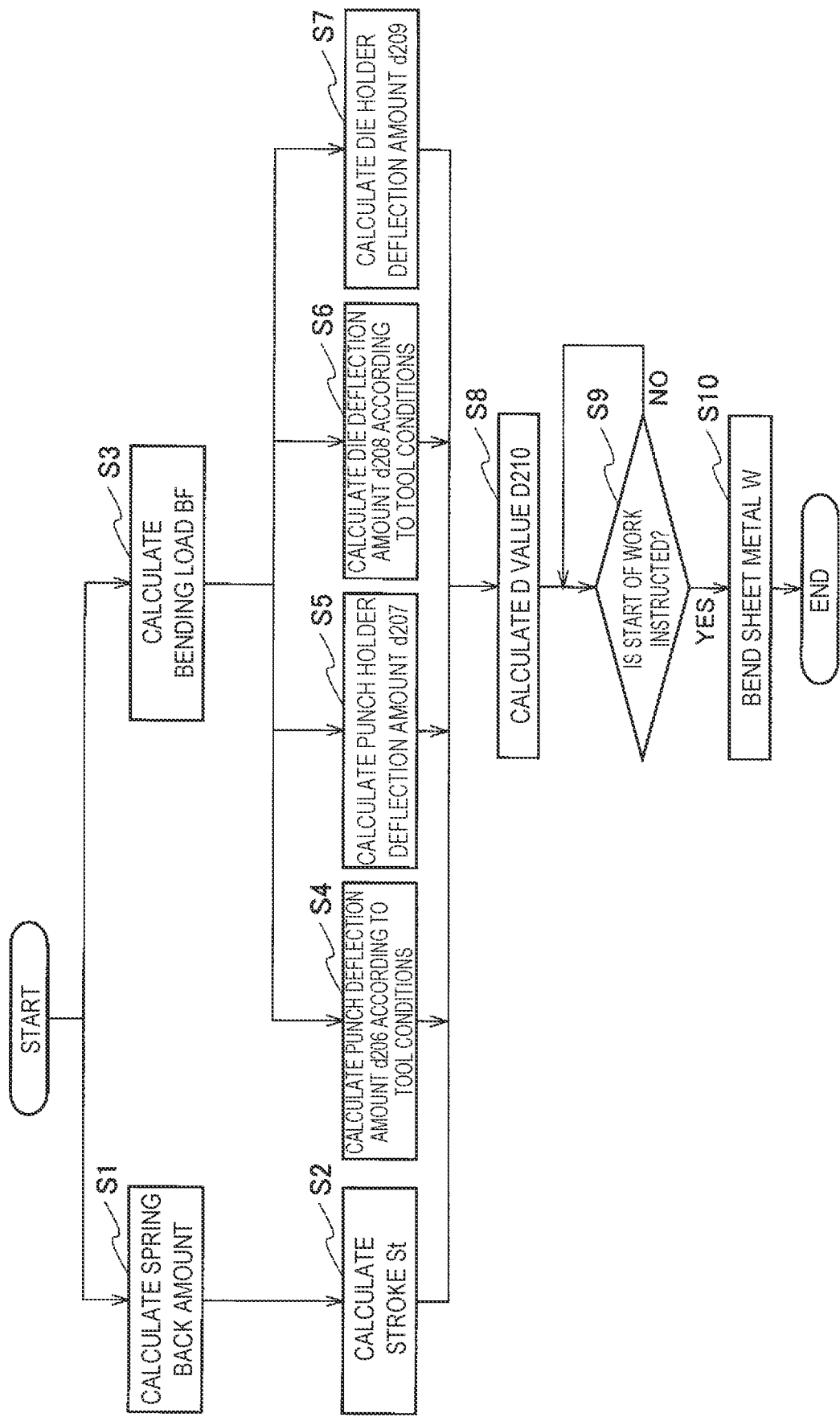
FIG. 13 is a flowchart showing processing of a press brake control method of the first embodiment.

By using a flowchart shown in FIG. 13, an operation in which the NC device 20 calculates the D value D210 that is the processing of the press brake control method of the first embodiment will be described again. In FIG. 13, for simplification, the processing by the side frame deflection amount calculation unit 204 and the upper and lower table deflection amount calculation unit 205 is omitted, and it is assumed that for the punch holder 13 and the die holder 14, one types are used in a fixed manner, respectively.

In FIG. 13, when the processing is started, the NC device 20 calculates a spring back amount in Step S1, and calculates a stroke St in Step S2. In parallel with Step S1, the NC device 20 calculates a bending load BF in Step S3.

The NC device 20 calculates a punch deflection amount d206 according to the tool conditions in Step S4, and calculates a punch holder deflection amount d207 in Step S5. The NC device 20 calculates a die deflection amount d208 according to the tool conditions in Step S6, and calculates a die holder deflection amount d209 in Step S7. In Step S8, the NC device 20 calculate a D value D210 by adding the respective deflection amounts to the stroke St.

In Step S9, the NC device 20 determines whether or not a start of bending of the sheet metal W is instructed. If there is no instruction to start work (NO), the NC device 20 repeats the process of Step S9. If there is an instruction to start work (YES), the NC device 20 bends the sheet metal W by lowering the upper table 11 by a distance indicated by the D value D210 in Step S10, and ends the processing.

According to the first embodiment, the bending accuracy of the sheet metal W can be further improved. It is not necessary to make it mandatory that the press brake control device of the first embodiment is provided with all of the side frame deflection amount calculation unit 204, the upper and lower table deflection amount calculation unit 205, the punch deflection amount calculation unit 206, the punch holder deflection amount calculation unit 207, the die deflection amount calculation unit 208, and the die holder deflection amount calculation unit 209.

The die deflection amount d208 is smaller than the punch deflection amount d206, and the die holder deflection amount d209 is smaller than the punch holder deflection amount d207. The die holder deflection amount d209 is smaller than the die deflection amount d208. Therefore, the bending accuracy of the sheet metal W can be improved even if the NC device 20 is provided only with the punch deflection amount calculation unit 206 and the punch holder deflection amount calculation unit 207. The NC device 20 may be provided at least with the punch deflection amount calculation unit 206 and the punch holder deflection amount calculation unit 207.

It is preferable that the NC device 20 is provided with the die deflection amount calculation unit 208 in addition to the punch deflection amount calculation unit 206 and the punch holder deflection amount calculation unit 207. It is further preferable that the NC device 20 is provided with the die deflection amount calculation unit 208 and the die holder deflection amount calculation unit 209 in addition to the punch deflection amount calculation unit 206 and the punch holder deflection amount calculation unit 207.

The NC device 20 may be provided with the punch deflection amount calculation unit 206 and the punch holder deflection amount calculation unit 207 in addition to the side frame deflection amount calculation unit 204 and the upper and lower table deflection amount calculation unit 205. The NC device 20 may be provided with the punch deflection amount calculation unit 206, the punch holder deflection amount calculation unit 207, and the die deflection amount calculation unit 208 in addition to the side frame deflection amount calculation unit 204 and the upper and lower table deflection amount calculation unit 205. As described above, in some cases, the upper and lower table deflection amount calculation unit 205 may be omitted.

Second Embodiment

Figure 14:
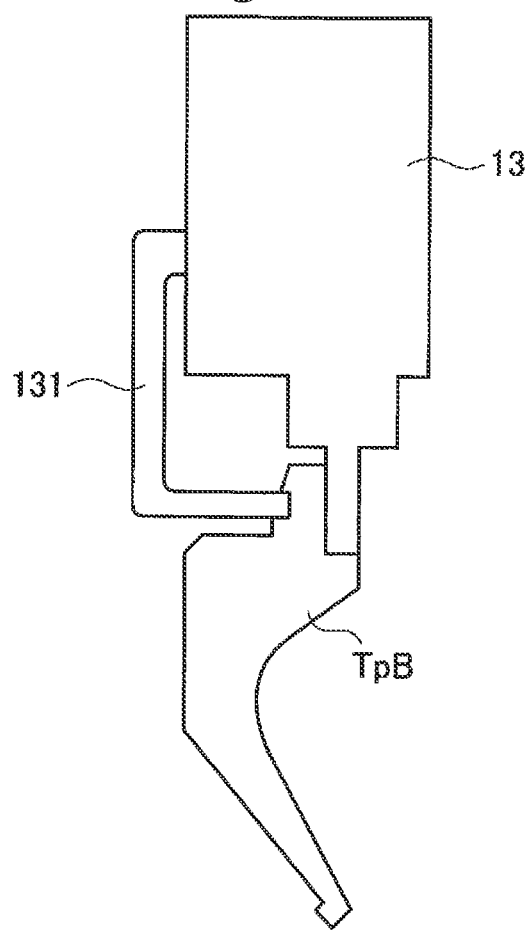
FIG. 14 is a side view showing a state in which the punch holder holds the gooseneck punch.
Figure 15:
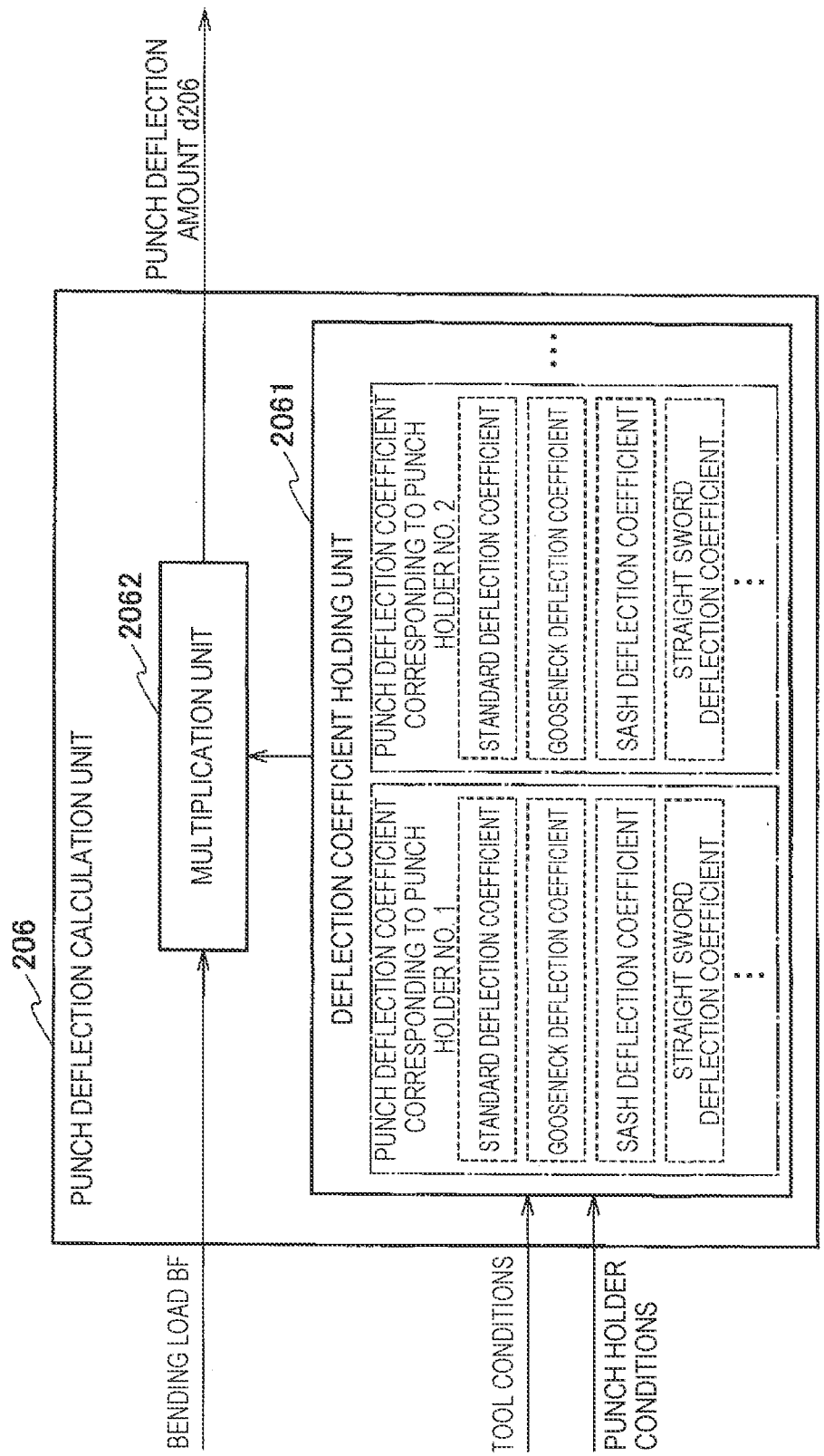
FIG. 15 is a block diagram showing a configuration example of a punch deflection amount calculation unit provided to a press brake control device of a second embodiment.

With reference to FIGS. 14 and 15, a press brake control device and a press brake control method of a second embodiment will be described. In the second embodiment, what is different from the first embodiment will be described, and description of the common part will be omitted.

FIG. 14 shows a state in which the punch holder 13 holds the gooseneck punch TpB as an example. Here, the punch holder 13 is an intermediate plate. A clamper 131 of the punch holder 13 clamps an upper end portion of the gooseneck punch TpB. Verification by the present inventors have revealed that the punch deflection amount d206 varies depending on the constraint conditions on which the punch holder 13 holds the punch Tp. The constraint conditions include a gripping force by the clamper 131 and a gripping position at which the clamper 131 clamps the punch Tp. To be more exact, the punch deflection amount d206 also varies depending on a friction coefficient between the punch holder 13 and the punch Tp.

Therefore, it is preferable that the punch deflection amount d206 is calculated in an exact manner according to the type of the punch holder 13 that holds the punch Tp. The relation between the bending load and the deflection amount with respect to the punch Tp in a state in which the punch holder 13 is holding the punch Tp may be obtained by actual measurement or by using the FEM analysis.

In the first embodiment, the punch deflection amount d206 of the punch Tp alone is calculated. In the second embodiment, the punch deflection amount d206 is calculated according to the type of the punch holder 13 that holds the punch Tp.

As shown in FIG. 15, the deflection coefficient holding unit 2061 holds a set of the standard deflection coefficient, the gooseneck deflection coefficient, the sash deflection coefficient, the straight sword deflection coefficient, and the deflection coefficients for the plurality of other punches corresponding to the types of the punch holders 13. A punch holder No. 1 is one type of the punch holders 13, and a punch holder No. 2 is another one type of the punch holders 13. The deflection coefficient holding unit 2061 may hold a set of deflection coefficients corresponding to the types of the punch holders 13 that the press brake 100 may use.

The punch deflection amount calculation unit 206 reads out, from the deflection coefficient holding unit 2061, the deflection coefficient k of the punch Tp, which is being used from among the set of deflection coefficients corresponding to the types of the punch holders 13, according to the input punch holder conditions and tool conditions, and supplies the read-out deflection coefficient k to the multiplication unit 2062. This enables the punch deflection amount calculation unit 206 to calculate a more exact punch deflection amount d206 according to the type of the punch holder 13 that holds the punch Tp.

Similarly, the die deflection amount calculation unit 208 can also calculate a more exact die deflection amount d208 according to the type of the die holder 14 that holds the die Td.

In the second embodiment, it is only necessary in Step S4 of FIG. 13 to calculate the punch deflection amount d206 according to the punch holder conditions and the tool conditions, and in Step S6 thereof to calculate the die deflection amount d208 according to the die holder conditions and the tool conditions.

According to the second embodiment, the bending accuracy of the sheet metal W can be further improved as compared to the first embodiment.

Third Embodiment

Figure 16:
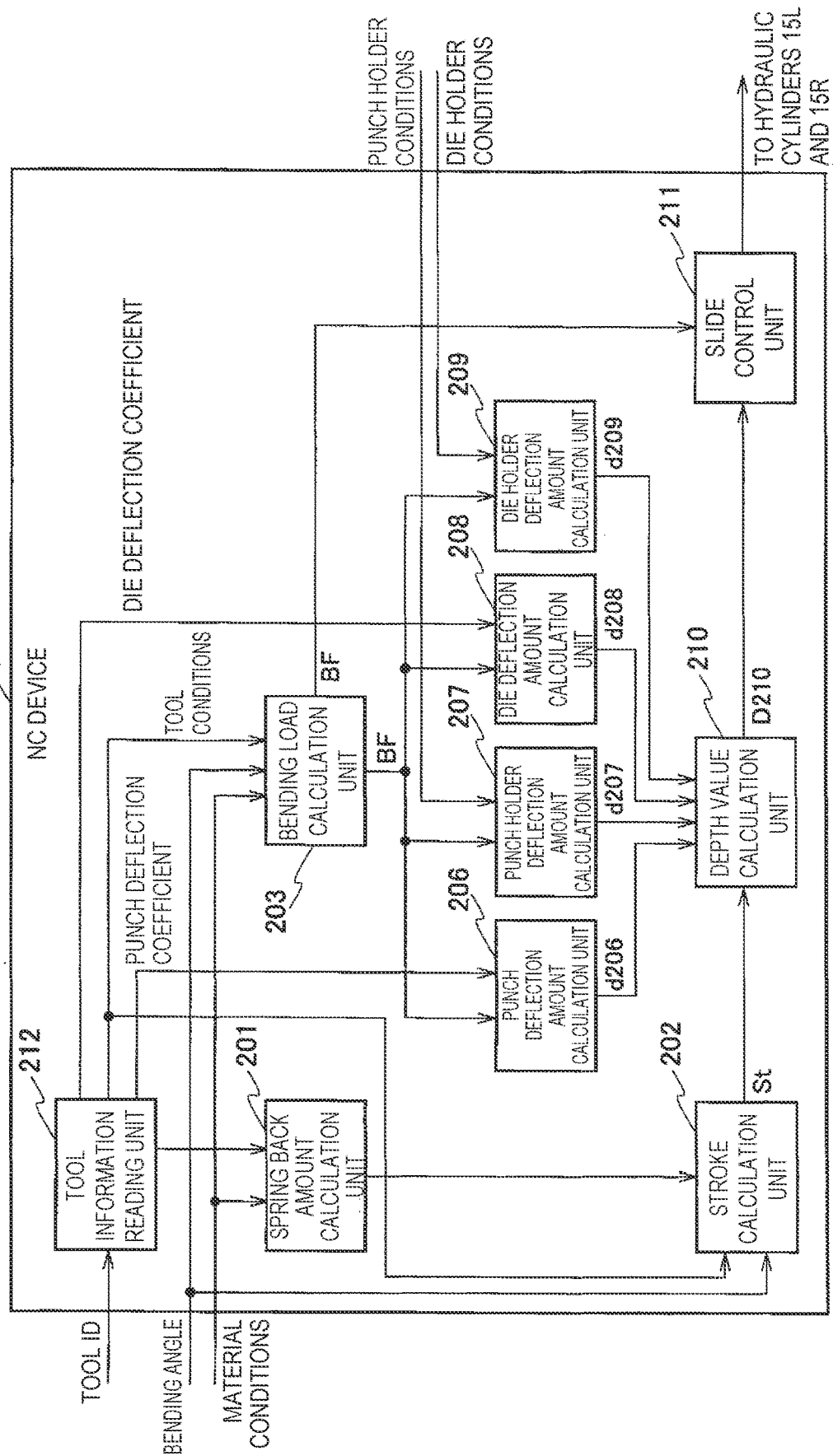
FIG. 16 is a block diagram showing a press brake control device of a third embodiment.
Figure 17:
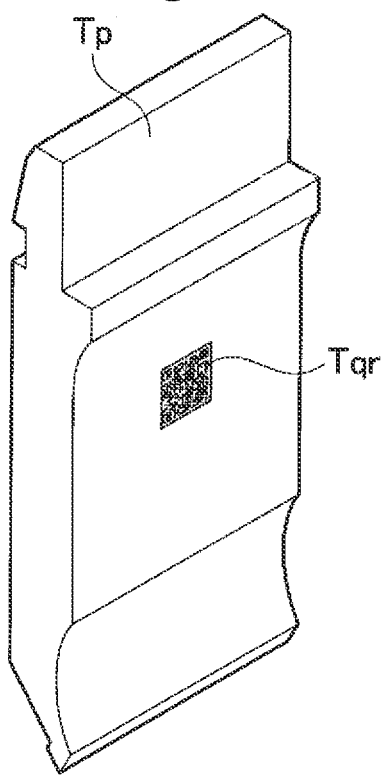
FIG. 17 is a perspective view showing an example of a tool having a tool ID.

With reference to FIGS. 16 to 18, a press brake control device and a press brake control method of a third embodiment will be described. In the third embodiment, what is different from the first embodiment will be described, and description of the common part will be omitted.

As shown in FIG. 16, the NC device 20 that is a press brake control device of the third embodiment includes a tool information reading unit 212. In FIG. 16, illustrations of the side frame deflection amount calculation unit 204 and the upper and lower table deflection amount calculation unit 205 are omitted.

As shown in FIG. 17, a two-dimensional code Tqr representing a tool ID is provided to each tool by, for example, laser marking. FIG. 17 illustrates a punch Tp on which a two-dimensional code Tqr is formed. FIG. 17 illustrates a state in which the two-dimensional code Tqr is marked on a back surface of the punch Tp. The two-dimensional code Tqr may be marked on a front surface or both surfaces of the tool. The operator reads out the two-dimensional code Tqr with a two-dimensional code reader 60 when the tool is mounted in the punch holder 13 or the die holder 14. The tool ID indicated by the read-out two-dimensional code Tqr is supplied to the tool information reading unit 212.

As shown in FIG. 18, in the tool ID, tool information including a tool type indicating whether the tool is a punch Tp or a die Td, a model number, a shape, an angle, a height, a pressure resistance, a deflection coefficient k, and other information is expressed by a predetermined number of digits (number of bits). The tool information may include necessary information depending on whether the tool is a punch Tp or a die Td. The deflection coefficient k is a deflection coefficient k of the punch Tp or the die Td. In the tool information, which bit indicates which information is determined in advance.

As described above, the tool used for bending the sheet metal W in the third embodiment is provided with the tool ID. The tool ID indicates tool information including various types of information on the tool. The tool information includes a deflection coefficient k for calculating a deflection amount of the tool (the punch deflection amount d206 or the die deflection amount d208) according to a predetermined bending load BF that is applied to the sheet metal W at a time when the sheet metal W is bent.

A data structure of the tool information shown in FIG. 18 is referred to by the NC device 20 that controls the press brake 100 for bending the sheet metal W by using the tool. The data structure of the tool information includes the deflection coefficient k referred to by the NC device 20 when the NC device 20 calculates a deflection amount of the tool according to a predetermined bending load BF that is applied to the sheet metal W at a time when the sheet metal W is bent.

The tool information reading unit 212 extracts information necessary for calculating a spring back amount from the input tool ID and supplies the extracted information to the spring back amount calculation unit 201. The tool information reading unit 212 supplies the tool conditions that are based on the tool ID to the bending load calculation unit 203. In addition, from the input tool ID, the tool information reading unit 212 extracts the deflection coefficient k of the punch Tp so as to supply it to the punch deflection amount calculation unit 206, and extracts the deflection coefficient k of the die Td so as to supply it to the die deflection amount calculation unit 208.

According to the third embodiment, since the NC device 20 can obtain a tool-specific deflection coefficient k by way of the tool ID provided to the tool, it is not necessary for the punch deflection amount calculation unit 206 and the die deflection amount calculation unit 208 to hold a plurality of deflection coefficients k according to the types of the tools. Therefore, according to the third embodiment, the configuration of the NC device 20 or the processing executed by the NC device 20 can be simplified.

Fourth Embodiment

Figure 19:
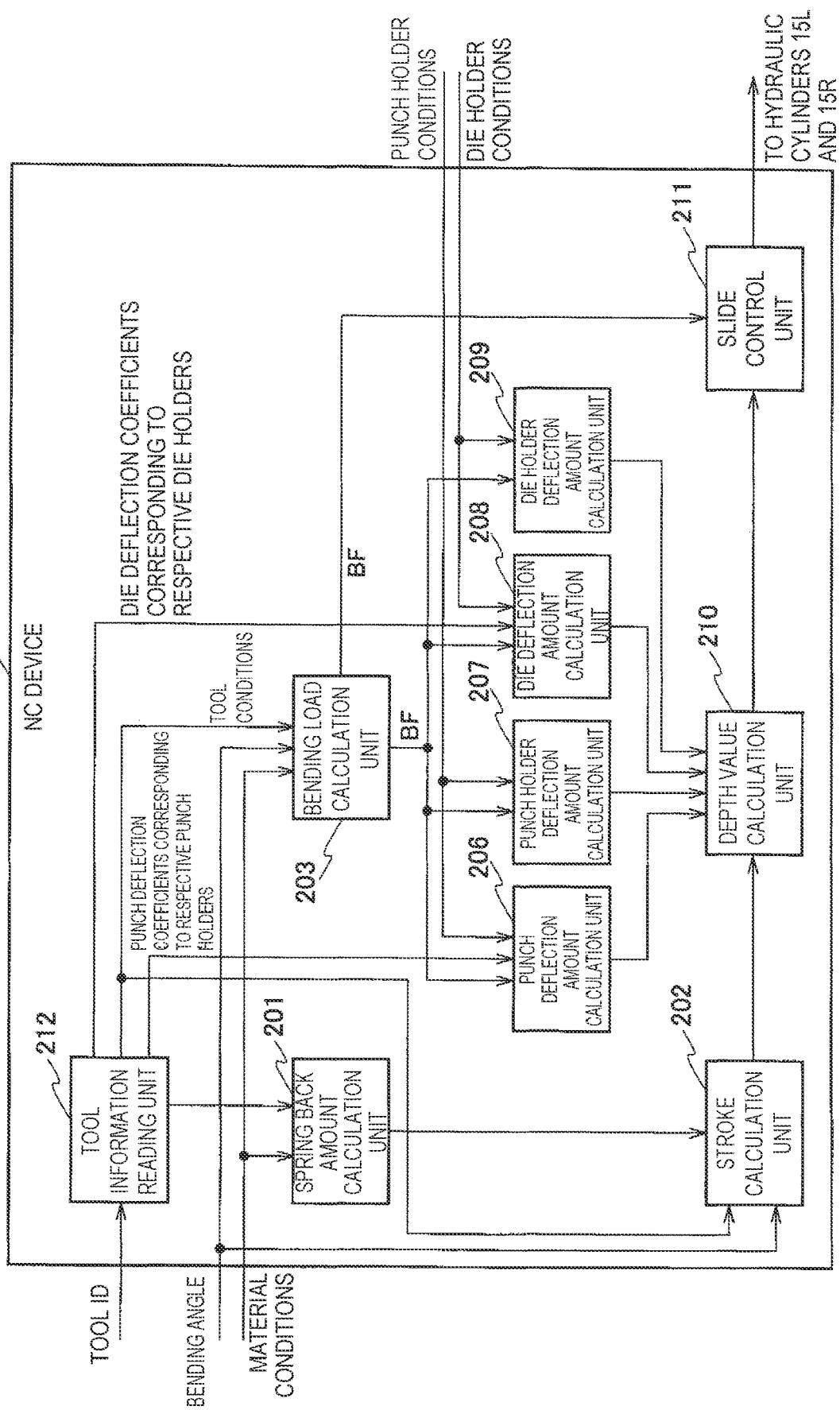
FIG. 19 is a block diagram showing a press brake control device of a fourth embodiment.

With reference to FIGS. 19 and 20, a press brake control device and a press brake control method according to a fourth embodiment will be described. In the fourth embodiment, what is different from the third embodiment will be described, and description of the common part will be omitted.

As described in the second embodiment, it is preferable that the punch deflection amount d206 or the die deflection amount d208 is each calculated according to the type of the punch holder 13 that holds the punch Tp or the die holder 14 that holds the die Td.

FIG. 20 shows tool information indicated by a tool ID provided to the tool that is used in the fourth embodiment, for example, in the case in which the tool is a punch Tp. As shown in FIG. 20, the tool information includes deflection coefficients k corresponding to the types of the punch holders 13. Here, the deflection coefficients k corresponding to three types of the punch holders 13, i.e., punch holders No. 1 to No. 3, are included.

As described above, the tool ID provided to the tool that is used in the fourth embodiment indicates tool information including a plurality of deflection coefficients k corresponding to the types of the tool holders for calculating the deflection amount of the tool according to the type of the tool holder that holds the tool. The data structure of the tool information shown in FIG. 20 includes the plurality of deflection coefficients k according to the types of the tool holders that are referred to by the NC device 20 when the NC device calculates the deflection amount of the tool corresponding to the type of the tool holder that holds the tool.

In FIG. 19, the tool information reading unit 212 extracts a plurality of deflection coefficients k of the punches Tp corresponding to the types of the punch holders 13 from the input tool ID, and supplies the extracted deflection coefficients k to the punch deflection amount calculation unit 206. In addition, the tool information reading unit 212 extracts a plurality of deflection coefficients k of the die Td corresponding to the type of the die holder 14 from the input tool ID, and supplies the extracted deflection coefficients k to the die deflection amount calculation unit 208.

The punch holder conditions, which indicate the punch holder 13 that is being used, are input to the punch deflection amount calculation unit 206, and the die holder conditions, which indicate the die holder 14 that is being used, are input to the die deflection amount calculation unit 208. The punch deflection amount calculation unit 206 selects the deflection coefficient k of the punch Tp corresponding to the punch holder 13 that is being used, and calculates the punch deflection amount d206. The die deflection amount calculation unit 208 selects the deflection coefficient k of the die Td corresponding to the die holder 14 that is being used, and calculates the die deflection amount d208.

According to the fourth embodiment, effects similar to those of the third embodiment can be exhibited, and the bending accuracy of the sheet metal W can be further improved as compared to the third embodiment.

The present invention is not limited to the first to fourth embodiments described above, and various modifications can be made without departing from the scope of the present invention. In configuring the press brake control device of each embodiment, whether to use software or hardware is arbitrary. The present invention is not limited to a configuration shown in FIGS. 2, 16, and 19, in which the configuration of the NC device 20 is realized by software.

In the first and second embodiments, the NC device 20 holds the deflection coefficient k and calculates each deflection amount. However, the NC device 20 may be configured to have the deflection coefficient k stored in a storage device external to the NC device 20, and to read the deflection coefficient k from the storage device.

FIG. 1 illustrates the lowering type press brake 100 in which the upper table 11 is lowered toward the lower table 12. An elevating type press brake in which the lower table 12 is elevated toward the upper table 11 may be used.

The disclosure of the present application is related to the subject matter described in Japanese Patent Application No. 2018-101219 filed on May 28, 2018, the entire disclosures of which are incorporated herein by reference.

The invention claimed is:

1. A press brake control device, comprising an NC device wherein:
the NC device is configured to calculate, when a sheet metal is sandwiched between a punch held by a punch holder and a die held by a die holder and the punch is moved toward the die to bend the sheet metal at a set bending angle, a stroke of the punch for bending the sheet metal at the bending angle in consideration of a spring back amount of the bent sheet metal;
the NC device is configured to calculate a bending load required to bend the sheet metal at the bending angle;
the NC device is configured to calculate a punch deflection amount that is a deflection amount of the punch according to the bending load, and varies depending on a constraint condition on which the punch holder holds the punch according to a type of the punch holder;
the NC device is configured to calculate a punch holder deflection amount that is a deflection amount of the punch holder according to the bending load;
the NC device is configured to calculate a depth value by adding at least the punch deflection amount and the punch holder deflection amount to the stroke, the depth value being a distance by which the punch is moved toward the die, and wherein
the constraint condition is a gripping force with which a clamper of the punch holder clamps the punch or a gripping position at which the clamper of the punch holder clamps the punch, or a friction coefficient between the punch holder and the punch.

2. The press brake control device according to claim 1, wherein the NC device is configured to calculate a punch deflection amount according to a type of the punch.

3. The press brake control device according to claim 2, wherein the NC device is configured to calculate a punch holder deflection amount according to a type of the punch holder.

4. The press brake control device according to claim 1, the NC device is further configured to calculate a die deflection amount that is a deflection amount of the die according to the bending load,
wherein the NC device is configured to calculate the depth value by adding at least the punch deflection amount, the punch holder deflection amount, and the die deflection amount to the stroke.

5. The press brake control device according to claim 4, wherein the NC device is configured to calculate a die deflection amount according to a type of the die.

6. The press brake control device according to claim 4, the NC device is further configured to calculate a die holder deflection amount that is a deflection amount of the die holder according to the bending load,
wherein the NC device is configured to calculate the depth value by adding at least the punch deflection amount, the punch holder deflection amount, the die deflection amount, and the die holder deflection amount to the stroke.

7. The press brake control device according to claim 1, wherein the NC device is configured to calculate a punch deflection amount according to a type of the punch holder that holds the punch.

8. A press brake control method, executed by a control device that controls a press brake for bending a sheet metal by sandwiching the sheet metal between a punch held by a punch holder and a die held by a die holder and then moving the punch toward the die, the press brake control method comprising:
calculating a stroke of the punch for bending the sheet metal at a set bending angle in consideration of a spring back amount of the bent sheet metal;
calculating a bending load required to bend the sheet metal at the bending angle;
calculating a punch deflection amount that is a deflection amount of the punch according to the bending load, and varies depending on a constraint condition on which the punch holder holds the punch according to a type of the punch holder;
calculating a punch holder deflection amount that is a deflection amount of the punch holder according to the bending load;
calculating a depth value by adding at least the punch deflection amount and the punch holder deflection amount to the stroke, the depth value being a distance by which the punch is moved toward the die; and
controlling such that the punch is moved by the depth value to bend the metal sheet, wherein
the constraint condition is a gripping force with which a clamper of the punch holder clamps the punch or a gripping position at which the clamper of the punch holder clamps the punch, or a friction coefficient between the punch holder and the punch.

9. The press brake control method according to claim 8, further comprising, by the control device, calculating a punch deflection amount according to a type of the punch.

10. The press brake control method according to claim 9, further comprising, by the control device, calculating a punch holder deflection amount according to a type of the punch holder.

11. The press brake control method according to claim 8, further comprising, by the control device:
further calculating a die deflection amount that is a deflection amount of the die according to the bending load; and
calculating the depth value by adding at least the punch deflection amount, the punch holder deflection amount, and the die deflection amount to the stroke.

12. The press brake control method according to claim 11, further comprising, by the control device, calculating a die deflection amount according to a type of the die.

13. The press brake control method according to claim 11, further comprising, by the control device:
calculating a die holder deflection amount that is a deflection amount of the die holder according to the bending load; and
calculating the depth value by adding at least the punch deflection amount, the punch holder deflection amount, the die deflection amount, and the die holder deflection amount to the stroke.

* * * * *